(12) United States Patent
McFarthing

(10) Patent No.: US 9,071,289 B2
(45) Date of Patent: Jun. 30, 2015

(54) TRANSCEIVER SUPPORTING MULTIPLE MODULATION SCHEMES

(75) Inventor: Anthony McFarthing, Ely (GB)

(73) Assignee: CAMBRIDGE SILICON RADIO LIMITED, Cambridge (GB)

( * ) Notice: Subject to any disclaimer, the term of this patent is extended or adjusted under 35 U.S.C. 154(b) by 78 days.

(21) Appl. No.: 13/453,997

(22) Filed: Apr. 23, 2012

(65) Prior Publication Data

US 2013/0281016 A1    Oct. 24, 2013

(51) Int. Cl.
   *H04B 5/00*  (2006.01)
   *H04B 5/02*  (2006.01)
   *H04W 4/00*  (2009.01)

(52) U.S. Cl.
   CPC .......... *H04B 5/02* (2013.01); *H04W 4/008* (2013.01); *H04B 5/00* (2013.01); *H04B 5/0056* (2013.01); *H04B 5/0075* (2013.01)

(58) Field of Classification Search
   CPC ....... H04W 4/008; H04B 5/00; H04B 5/0056; H04B 5/0075; H04B 5/02
   USPC ................................. 455/41.1, 41.2
   See application file for complete search history.

(56) References Cited

U.S. PATENT DOCUMENTS

| | | | |
|---|---|---|---|
| 6,650,227 B1 * | 11/2003 | Bradin ........................ | 340/10.3 |
| 7,738,592 B2 * | 6/2010 | Fukuoka et al. ............. | 375/295 |
| 2003/0003880 A1 * | 1/2003 | Ling et al. ................... | 455/92 |
| 2003/0011436 A1 * | 1/2003 | Shigematsu ................. | 330/311 |
| 2004/0176063 A1 * | 9/2004 | Choi ............................ | 455/266 |
| 2006/0170500 A1 * | 8/2006 | Fujimoto et al. ............. | 330/283 |
| 2006/0285605 A1 * | 12/2006 | Walton et al. ................ | 375/267 |
| 2007/0206695 A1 * | 9/2007 | Ye et al. ....................... | 375/267 |
| 2008/0007335 A1 | 1/2008 | Park et al. | |

(Continued)

FOREIGN PATENT DOCUMENTS

| | | |
|---|---|---|
| EP | 2458673 A2 | 5/2012 |
| GB | 2496459 A | 5/2013 |

(Continued)

OTHER PUBLICATIONS

Office Action for German Application No. DE 10 2013 005059.6, mailed on Mar. 22, 2014 and English Translation of Office Action.

(Continued)

*Primary Examiner* — Wesley Kim
*Assistant Examiner* — Devan Sandiford
(74) *Attorney, Agent, or Firm* — John W. Branch; Lowe Graham Jones PLLC

(57) ABSTRACT

The present application relates to a transceiver for use in a communications system that uses magnetic field induction to transmit data, the transceiver having an amplifier for driving an antenna, the amplifier forming, with a capacitance and a resistance connected in parallel with the antenna, a parallel resonant circuit. The resistance value of the resistance is adjustable, to permit adjustment of the loaded quality factor of the parallel resonant circuit. The transceiver includes a processing unit configured to determine the signal to noise ratio (SNR) of a signal received by the transceiver, and based on this SNR select a modulation scheme to apply to a data signal to be transmitted by the transceiver. The value of the resistance is adjusted to a level at which the loaded quality factor of the parallel resonant circuit is able to support the bandwidth and data rate required by the selected modulation scheme.

9 Claims, 4 Drawing Sheets

(56) References Cited

U.S. PATENT DOCUMENTS

| | | | |
|---|---|---|---|
| 2008/0164955 A1* | 7/2008 | Pfeiffer et al. | 331/117 R |
| 2009/0022241 A1* | 1/2009 | Fukuoka et al. | 375/298 |
| 2009/0273454 A1 | 11/2009 | Onozuka et al. | |
| 2010/0019848 A1* | 1/2010 | Rossi | 330/253 |
| 2010/0136911 A1* | 6/2010 | Sekita et al. | 455/41.2 |
| 2010/0246704 A1* | 9/2010 | Ketchum et al. | 375/267 |
| 2010/0328045 A1* | 12/2010 | Goto et al. | 340/10.4 |
| 2011/0064030 A1* | 3/2011 | Wu et al. | 370/328 |
| 2011/0140537 A1* | 6/2011 | Takei | 307/104 |
| 2011/0261899 A1* | 10/2011 | Walton et al. | 375/295 |

FOREIGN PATENT DOCUMENTS

| | | |
|---|---|---|
| JP | 2005011009 A | 1/2005 |
| JP | 2009027410 A | 2/2009 |
| WO | 2008117029 A2 | 10/2008 |

OTHER PUBLICATIONS

Search Report for United Kingdom Application No. GB1301812.2, mailed Jul. 26, 2013.

* cited by examiner

TRANSCEIVER SUPPORTING MULTIPLE MODULATION SCHEMES

TECHNICAL FIELD

The present application relates to a transceiver for use in a communications system that uses magnetic field induction to transmit data.

BACKGROUND TO THE INVENTION

Part of a known near field communication (NFC) system is shown schematically at 10 in FIG. 1. In the system of FIG. 1 a transmitter section of an NFC reader 12 comprises a voltage source power amplifier 14 having differential outputs that are connected to input terminals of an antenna 16. Capacitances 18a, 18b are connected in series between the outputs of the power amplifier 14 and the input terminals of the antenna 16. A further capacitance 20 is connected in parallel between the outputs of the power amplifier 14 and the antenna 16, whilst resistances 22a, 22b are connected in series between the capacitances 18a, 18b and the input terminals of the antenna 16. The capacitances 18a, 18b, 20 and resistances 20a, 20b form, with the inductance of the antenna 16, a mainly series resonant circuit.

An NFC tag 24 communicates with the reader 12 by means of an antenna 26, with the other components of the tag 24 being represented by a capacitor 28 and a resistor 30 connected in parallel with the antenna 26.

The power amplifier 14, capacitances 18a, 18b, 20 and resistances 22a, 22b may be implemented as part of an integrated circuit (i.e. may be "on-chip" components), whilst the antenna 16 is an off-chip component (i.e. it is external to the integrated circuit containing the power amplifier 14, capacitances 18a, 18b, 20 and resistances 22a, 22b).

The resonant frequency of the resonant network formed from the capacitances 18a, 18b, 20, resistances 22a, 22b and the self-inductance of the antenna 16 is determined at least in part by the value of the capacitances 18a, 18b, 20. For optimum transmission of data it is important that the resonant frequency of the parallel resonant circuit is equal to, or at least very close to, the frequency of the signal to be transmitted by the reader 12.

As will be appreciated by those skilled in the art, the reader 12 of the NFC system illustrated in FIG. 1 uses a series resonant antenna 16. This is required because only a series resonant antenna is able to power the external passive tag 24. However, the use of the series resonant antenna 16 limits the magnetic field strength that can be achieved by the antenna 16 of the reader 12 for the current through the antenna 16 that creates a magnetic field can never be greater than the current output by the power amplifier 14.

SUMMARY OF INVENTION

The present application relates to a transceiver for use in a communications system that uses magnetic field induction to transmit data, the transceiver having an amplifier for driving an antenna, the amplifier forming, with a capacitance and a resistance connected in parallel with the antenna, a parallel resonant circuit. The resistance value of the resistance is adjustable, to permit adjustment of the loaded quality factor of the parallel resonant circuit. The transceiver includes a processing unit that is configured to determine the signal to noise ratio (SNR) of a signal received by the transceiver, and based on this SNR select a modulation scheme to apply to a data signal to be transmitted by the transceiver. The value of the resistance is adjusted to a level at which the loaded quality factor of the parallel resonant circuit is able to support the bandwidth and data rate required by the selected modulation scheme.

According to a first aspect of the invention there is provided a transceiver for use in a communications system that uses magnetic field induction to transmit data, the transceiver comprising: an amplifier for driving an antenna; a capacitance connected in parallel with the antenna; a resistance connected in parallel with the capacitance and the antenna, such that the antenna, capacitance and resistance form a parallel resonant circuit, wherein the value of the resistance is variable to permit adjustment of the loaded quality factor of the resonant circuit.

The adjustable resistance value permits adjustment of the loaded quality factor of the parallel resonant circuit. By enabling the loaded quality factor of the parallel resonant circuit to be adjusted in this way the transceiver is able dynamically to select a modulation scheme that is appropriate for the prevailing conditions of a communication channel between the transceiver and a receiver, and to adjust the loaded quality factor of the parallel resonant circuit to a level that supports the signal bandwidth required by the selected modulation format. Thus, data throughput between the transceiver and the receiver can be optimised dynamically for the prevailing channel conditions to achieve the best possible data throughput rate.

The value of the capacitance may be variable, to permit tuning of a resonant frequency of the resonant circuit.

The transceiver may further comprise a processing unit, the processing unit being configured to control the value of the resistance.

The processing unit may be configured to determine a signal to noise ratio (SNR) of a signal received by the transceiver.

The processing unit may be configured to select, based on the determined SNR of the signal received by the transceiver, a modulation scheme for modulating signals to be transmitted by the transceiver.

The processing unit may be configured to adjust the value of the resistance to adjust the loaded quality factor of the parallel resonant circuit to support the signal bandwidth required by the selected modulation scheme.

Where the value of the capacitance is variable to permit tuning of a resonant frequency of the parallel resonant circuit, the processing unit may be configured to control the value of the capacitance.

The power amplifier may be implemented by one or more transistors.

The transistors may be, for example, PMOS or NMOS transistors.

The resistance may be implemented by one or more variable cascodes.

The capacitance may be implemented by one or more digitally variable capacitors.

The transceiver may further comprise a receive section having a resonant circuit comprising a variable resistance, a capacitance and a self impedance of the antenna, the variable resistance of the receive section being implemented by inductive or capacitive degeneration.

BRIEF DESCRIPTION OF THE DRAWINGS

Embodiments of the invention will now be described, strictly by way of example only, with reference to the accompanying drawings, of which

DESCRIPTION OF THE EMBODIMENTS

Figure 2:
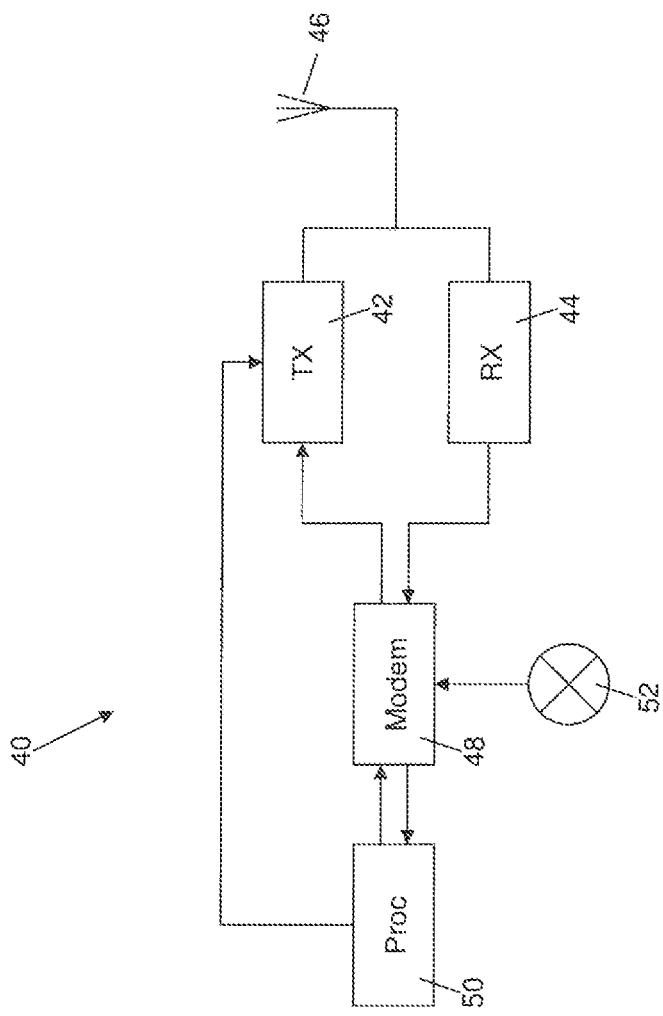
FIG. 2 is a schematic block diagram representing a transceiver according to an embodiment of the present invention.

FIG. 2 is a schematic block diagram illustrating components of a transceiver 40. It is to be appreciated that the block diagram of FIG. 2 shows only those components that are required to impart to the skilled person an understanding of the present invention, and that a practical transceiver will include additional components.

Figure 1:
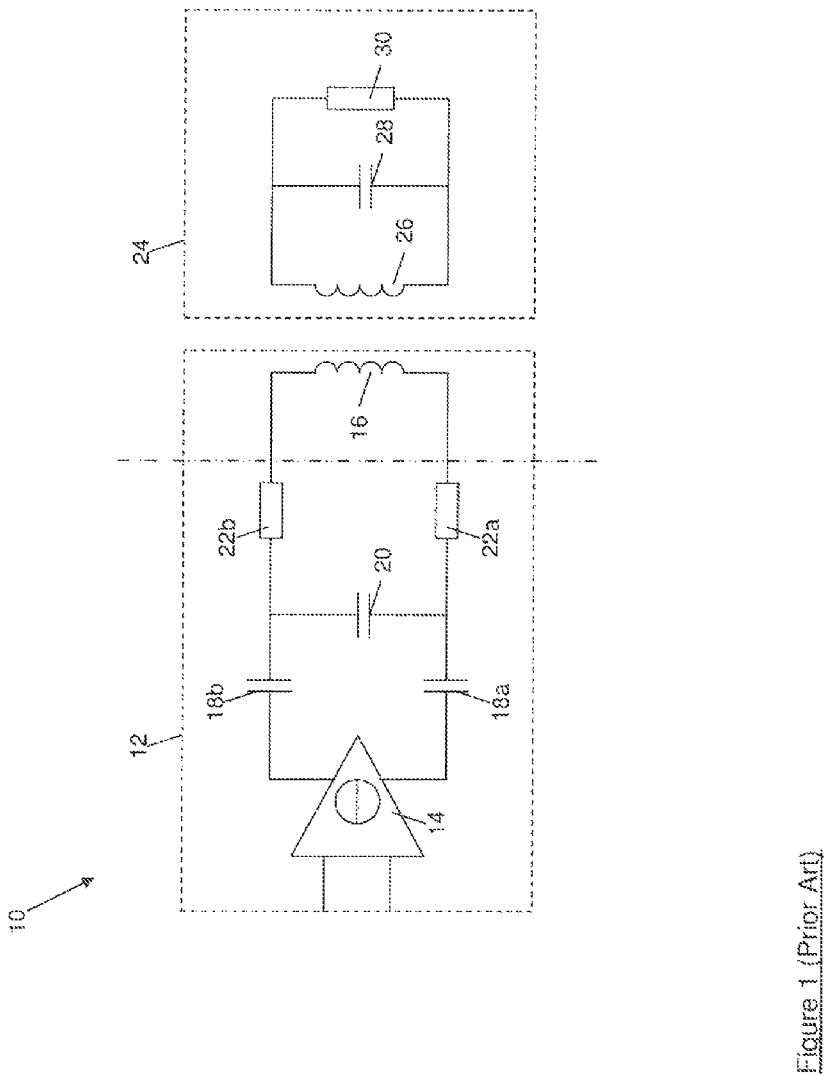
FIG. 1 is a schematic representation of a known NFC reader and tag.

The transceiver 40 illustrated in FIG. 2 is for use in a scheme referred to as Near Ultra Low Energy Field (NULEF) communications. NULEF is similar to NFC, in that communication of data between a NULEF transmitter and a NULEF receiver is achieved by means of magnetic field induction. However, in a NULEF system the antennas used in the transmitter and receiver are completely symmetrical, and so the performance of the transceiver 40 is not compromised when switching between transmit and receive modes, as would occur with the NFC system of FIG. 1.

The transceiver 40 includes a transmit antenna section 42 and a receive antenna section 44, which are each connected to a common antenna 46, such that the transmit section 42 is able to transmit signals via the antenna 46 and the receive section 44 is able to receive signals via the antenna 46.

A modulator/demodulator (modem) unit 48 is connected to both the transmit antenna section 42 and the receive antenna section 44, and is configured to modulate data signals provided by a processing unit 50 to be transmitted by the transmit antenna section 42 onto a carrier signal provided by a signal generator 52. The modulator/demodulator unit 48 is also configured to demodulate signals received by the receive antenna section 44, and to transmit the demodulated received signals to the processing unit 50.

The processing unit 50 generates data signals to be modulated and transmitted, and processes received demodulated data signals. The processing unit 50 is also operative to control the quality factor and resonant frequency of the transmit antenna section 42, and to select an appropriate modulation scheme for data to be transmitted to optimise data throughput between the transceiver 40 and a receiver with which it is communicating for the prevailing communication channel conditions, as will be described in more detail below.

Figure 3:
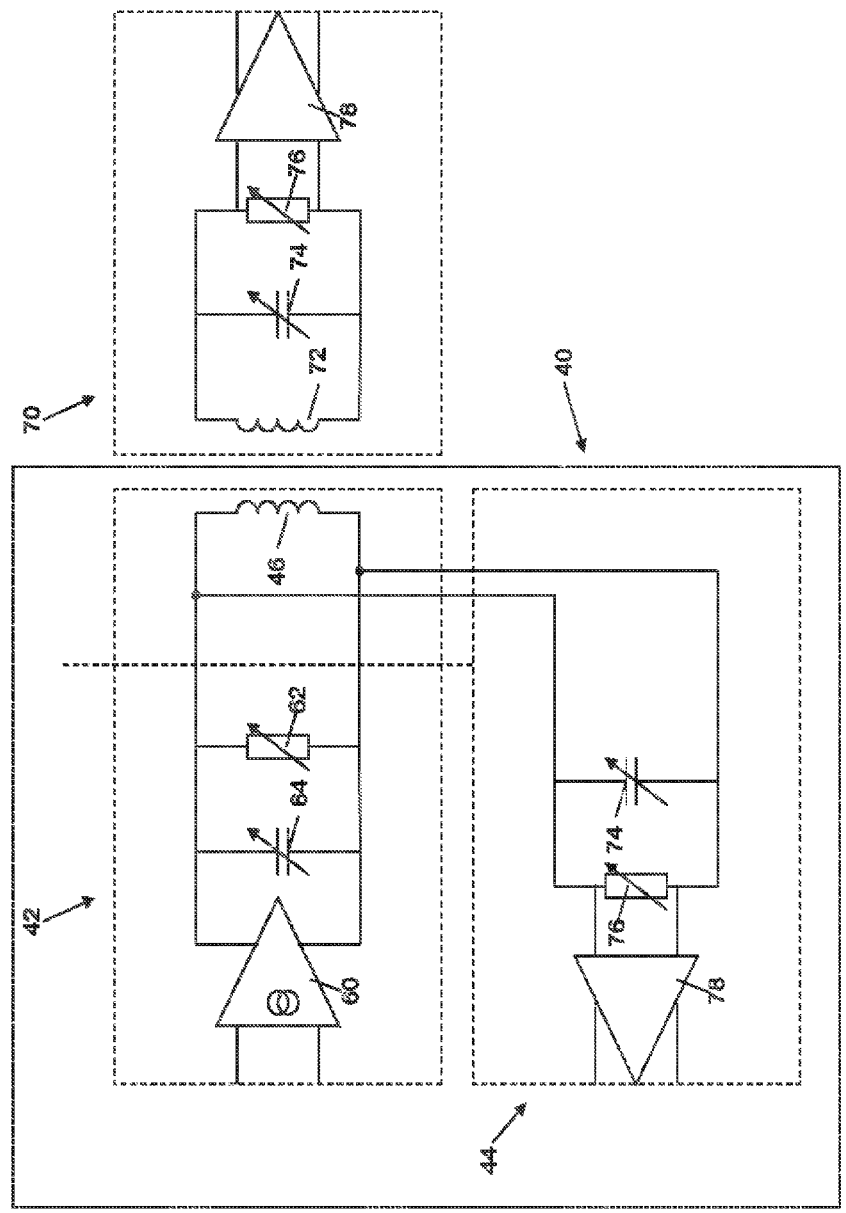
FIG. 3 is a schematic representation illustrating a transmit section of the transceiver shown in FIG. 2.

FIG. 3 shows the transmit antenna section 42 of the transceiver 40 and the receive antenna section 70 of a remote transceiver in more detail, as well as the receive antenna section 44 of the transceiver 40. The remote transceiver 70 may be a transceiver of the type illustrated at 40 in FIG. 2. Again, it is to be appreciated that the schematic diagram of FIG. 3 shows only those components of the transmit antenna section 42 and the receive antenna section 44 that are necessary for understanding of the present invention, and that a practical implementation of a transmit antenna section and a receive antenna section of a NULEF transceiver may include other components in addition to those shown in FIG. 3. It is to be noted that the same antenna matching structure is used in both the transmit antenna section 42 and the receive antenna section 44 of a NULEF transceiver 40.

The transmit antenna section 42 of the transceiver 40 comprises a power amplifier 60 having differential current outputs which are connected to input terminals of the antenna 46. A variable resistance 62 and a variable capacitance 64 connected to the outputs of the power amplifier 60 in parallel with the antenna 46 form, with the self-inductance of the antenna 46, a parallel resonant network. It is to be understood that the variable resistance 62 need not be implemented as a physical variable resistor component, but may be implemented in any suitable way. For example the resistance 62 may be generated parasitically in the power amplifier 60 using a technique that allows the parasitically generated resistance to be adjusted to a desired value, or may be implemented using a bank of switchable fixed resistances.

The transmit antenna section 42 of the reader 40 communicates with a receive antenna section 70 of a NULEF receiver or another NULEF transceiver acting in a receive mode. For the sake of clarity, the receiving device will be referred to hereinafter as a receiver, but it will be appreciated that this term encompasses a NULEF transceiver acting in a receive mode.

The receive antenna section 70 of the receiver (which, in the example illustrated in FIG. 3, is a transceiver of the type illustrated at 40 in FIG. 2) communicates with the transmit section 42 of the transceiver 40 by means of an antenna 72, with the other components of the receiver being in part represented by a variable capacitance 74 and a variable resistance 76 connected in parallel with the antenna 72 to form, with the self impedance of the antenna 76, a resonant circuit. The receiver also includes a low noise amplifier (LNA) 78 having differential inputs that are connected in parallel with the antenna 72, the variable capacitance 74 and the variable resistance 76. Again, it is to be understood that the variable resistance 76 need not be implemented as a physical variable resistor component, but may be implemented in any suitable way. For example the resistance 76 may be generated parasitically in the LNA 78 using a technique that allows the parasitically generated resistance to be adjusted to a desired value, or may be implemented using a bank of switchable fixed resistances.

The receive antenna section 44 of the transceiver 40 is also shown in FIG. 3. As the receive antenna section 44 is identical in structure and function to the receive antenna section 70 of the remote transceiver described above, since the receiver in the example illustrated in FIG. 3 is a transceiver of the type described above and illustrated at 40 in FIG. 2. Accordingly, the components of the receive section 44 shown in FIG. 3 are identified with the same reference signs used to identify the components of the receive section 70 shown in FIG. 3.

The antenna 72 receives signals from the transmit antenna 46 by magnetic field induction, and these received signals are sensed by the LNA 78. Where a transceiver 40 incorporating the receive antenna section 44 is operating in receive mode, the power amplifier 60 of the transmit section 42 of the receiving transceiver 40 will normally be disabled (although in some instances the antenna 72 may be tuned by an active receiver while the power amplifier 60 is operating), and may present some parasitic capacitance, which increases the effective capacitance represented in FIG. 3 by the variable capacitance 74. The receiving transceiver must be able to maintain the centre frequency of the resonant circuit formed by the combination of the inductance of the antenna 72 with the capacitance 74 and the resistance 76, and so the capacitance 74 in the receiver is variable to permit adjustment to the centre frequency of the resonant circuit of the receiver to compensate for parasitic capacitance from the disabled amplifier 60 and the like. To reject unwanted noise the bandwidth of the receive antenna section 44 must also be controlled according to the received data rate. The resistance 76 is variable to permit this. The optimum noise figure for the LNA 78 will usually be achieved when the receive antenna 72 is tuned correctly.

The resonant frequency of the parallel resonant circuit formed from the variable resistance 62, variable capacitance 64 and the self-inductance of the antenna 46 of the transmit antenna section 42 is determined at least in part by the value of the variable capacitance 64. Thus, by adjusting the capacitance value of the variable capacitance 64 the resonant frequency of the parallel resonant circuit of the transmit antenna section 42 can be tuned to the centre frequency of a carrier signal used by the transceiver to transmit data, to ensure optimum transmission of the signal to be transmitted.

A number of factors affect the performance of a system of the type illustrated in FIG. 3. The Shannon-Hartley theorem on the capacity of a communication channel that is subject to noise, as in the case of a communication channel between the transmit antenna section 42 and the receive antenna section 44 of FIG. 3, states:

$$C = B\log_2\left(1 + \frac{S}{N}\right), \quad (1)$$

where C is the channel capacity in bits per second, B is the channel bandwidth in Hertz, S is the received signal power in Watts, and N is the received noise power in Watts. In a NULEF system the received noise level is almost solely determined by the noise generated by the resistance in the turns of the receiver antenna coil.

The received signal power S in the communication channel of the NULEF system shown in FIG. 3 is inversely proportional to the physical distance or separation between the antenna 46 of the transmit antenna section 42 and the antenna 72 of the receive antenna section 44. The exact relationship with distance for the NULEF system illustrated in FIG. 3 is a complicated polynomial that is expressed as $D^P$ in equation (2) below:

$$S \propto \frac{1}{D^{\wedge}P}, \quad (2)$$

where D is the distance between the antennas 46, 72

For closely coupled antennas the overall bandwidth of the path from transmitter to receiver is interactive, but this effect is ignored in this analysis. NULEF is intended to be a long range system so low coupled systems would be the normal operating mode. The load resistance of the receiving antenna 72 is made large (e.g. greater than 300 Ohms) to reduce the loading effect on the transmitter when the antennas are more closely coupled. (However, in situations where the magnetic field strength is dangerously high a small load resistance may need to be used for overvoltage protection). This also helps to reduce the interaction between the transmit antenna section 42 and the receive antenna section 44 in a NULEF transceiver 40 in more closely coupled situations.

The bandwidth B of the communication channel is inversely proportional to the loaded quality factor of the parallel resonant circuit of both the transmit antenna section 42 and the receive antenna section 44, i.e.

$$B \propto \frac{1}{Q}, \quad (3)$$

whilst the loaded quality factor Q of either the transmit section 42 or the receive section 44 is given by the equation $$Q = \frac{R}{\overline{\omega}L}, \quad (4)$$

where $\overline{\omega} = 2\pi F_0$, such that $$Q = \frac{R}{2\pi F_0 L}, \quad (5)$$

where R is the value in Ohms of the resistance 62, $F_0$ is the resonant frequency in Hertz of the parallel resonant circuit and L is the value in Henrys of the self inductance of the antenna 46.

The current in the antenna 46 is amplified by a factor that is dependent on the loaded quality factor Q of the parallel resonant circuit as follows:

$$I_{ind} = I_{input} Q \quad (6)$$

where $I_{ind}$ is the current in Amps in the antenna 46 and $I_{input}$ is the current input to the parallel resonant circuit from the power amplifier 60.

The strength of a magnetic field generated around the antenna 46 is proportional to the current flow in the antenna 46. Thus, where the loaded quality factor Q is high the strength of the magnetic field around the antenna 46 will also be high, since the current in the antenna 46 is dependent on the loaded quality factor Q as indicated by equation (6) above.

The important NULEF effect is apparent from equation 6, where the current through the antenna 46 is the output current of the power amplifier 60 multiplied by the loaded Q of the transmit antenna section 42. The magnetic field strength around the transmit antenna 46 is therefore increased by a factor of Q times above what would be possible for a series tuned circuit. The range of the NULEF is therefore increased. Alternatively for a fixed system range the output current of the power amplifier 60 can be reduced by Q times. As the power dissipation at the transmitter is determined by the current through the resistance 62, which is Q times less than through the antenna 46, the dissipation of energy (or power) can be very low and hence the system name NULEF.

If this magnetic field were to be loaded with a receive antenna section 44 having a low quality factor then for high coupling factors (e.g. where the distance between the transmitting antenna 46 and the receiving antenna 72 is small) the quality factor of the parallel resonant circuit of the transmit antenna section 42 would collapse, reducing the strength of the magnetic field around the antenna 46.

On the other hand, if the magnetic field were to be loaded with a receive antenna section 44 having a high quality factor, the quality factor of the parallel resonant circuit of transmit antenna section 42 would be maintained, and thus the strength of the magnetic field around the antenna 46 would also be maintained. However, as the bandwidth of the communication channel between the transmit antenna section 42 and the receive antenna section 44 is inversely proportional to the overall loaded quality factor of the parallel resonant circuit of the transmit and receive antennas section 42, 44 (as indicated in equation (3) above), the high quality factor limits the bandwidth, and thus the channel capacity or (maximum data rate in the communication channel) is limited in such circumstances, since the channel capacity is proportional to the bandwidth, as indicated by equation (1) above.

The loaded quality factor of the parallel resonant circuit formed from the variable resistance 62, variable capacitance 64 and the self-inductance of the antenna 46 is dependent at least in part on the resistance value of the variable resistance 62, as indicated by equations (4) and (5) above. Thus, by adjusting the resistance value of the variable resistance 62 the loaded quality factor of the parallel resonant circuit of the transmit antenna section 42 can be adjusted. As the bandwidth and channel capacity of a communication channel between the transmit antenna section 42 and the receive antenna section 44 are inversely proportional to the loaded quality factor (see equations (1) and (3) above) by adjusting the resistance values of the variable resistances 62, 76 the channel capacity of the communication channel can be adjusted for optimum performance in different circumstances, as will be explained in more detail below.

Referring again to FIG. 2, it can be seen that the processing unit 50 is configured to transmit control signals to the transmit antenna section 42. Additionally, as is described above, the processing unit 50, in conjunction with the modem 48, generates modulated signals for transmission by the transmit section 42 to a receiver.

In particular, the processing unit 50 is configured to transmit control signals to the variable resistance 62, to cause the loaded quality factor of the resonant circuit of the transmit antenna section 42 to be altered, thereby changing the channel capacity of a communication channel between the transmit antenna section 42 and the receive antenna section 44.

The processing unit 50 is also configured to transmit control signals to the variable capacitance 64, to cause the capacitance value of the variable capacitance 64 to be altered to compensate for any deviation in the resonant frequency of the parallel resonant circuit of the transmit section 42 from the centre frequency of the carrier signal, thereby helping to ensure optimum transmission of the modulated carrier signal. The processing unit 50 receives a signal from the receive antenna section 44 that represents the input impedance of the antenna 46. For example, the receive antenna section 44 may include a quadrature receiver having a phase detector which is configured to detect the phase of a signal at the input of the antenna 46. A change in the impedance of the antenna 46 causes a corresponding change in the phase of the signal at the input of the antenna 46. The processing unit 50 may be configured to detect such a change in the phase of the signal at the input of the antenna 46 and to output a signal to adjust the capacitance value of the variable capacitances 64 to reduce the change in the phase of the signal at the input of the antenna 46. As the processing unit 50 receives a signal representing input impedance of the antenna 46, the processing unit 50 is able to dynamically adjust the capacitance value of the variable capacitance 64

The transceiver 40 is configured to support a range of different modulation formats for transmission of data, and to select an appropriate modulation format according to the prevailing conditions of the channel. For example, the transceiver 40 may be configured to modulate data signals to be transmitted using a low bandwidth QPSK (quadrature phase shift keying) modulation scheme that requires a received signal with a relatively low signal to noise ratio (SNR), e.g. where the separation between the transmitting antenna 46 and receiving antenna 72 is large. A data rate of about 300 kilobits per second might be possible in this communication channel.

Where channel conditions produce a received signal with a large SNR (e.g. where antenna separation is small), a 256QAM (quadrature amplitude modulation) scheme could be used to modulate data signals to be transmitted, at bandwidths between 10 and 20 MHz with corresponding maximum data rates greater than 100 megabits per second. The use of orthogonal frequency division multiplexing (OFDM) in combination with these modulation schemes would also be a useful addition. The natural amplitude and group delay distortion resilience of OFDM would act to keep the error vector magnitude (EVM) low even though the bandwidth of the NULEF system might be changing dynamically and adaptively, thereby changing the amplitude and group delay characteristics.

In order for a signal to be received intelligibly its SNR must be high enough (or its EVM low enough) for the signal to be decoded by the intended recipient. The SNR of signals transmitted or received by the transceiver 40 decreases as their bandwidth increases (i.e. SNR is inversely proportion to signal bandwidth). However, higher data rate modulation schemes require higher signal bandwidths. Thus, a balance must be struck between data rate and SNR.

The processing unit 50 is configured to determine the SNR of a signal received by the receive section 44 of the transceiver 40. The SNR of a received signal is influenced by prevailing channel conditions such as the distance between the transmitting antenna 46 and the receiving antenna 72, and is indicative of the SNR that may be expected for a signal received by the receive antenna section 44 of the receiver. Thus, the SNR of a signal received by the receive antenna section 44 of the transceiver 40 can be used by the processing unit 50 to select an appropriate modulation scheme for signals transmitted by the transmit antenna section 42.

For example, the processing unit 50 may be configured to compare the SNR of the received signal to one or more thresholds or to a look-up table, to select a modulation scheme that is appropriate to the prevailing channel conditions. This modulation scheme can be applied to signals to be transmitted. Once the modulation scheme has been selected, the signal bandwidth required to successfully transmit signals using the selected modulation scheme (i.e. the bandwidth required to transmit the signals such that the SNR and EVM are optimised enough for the signals to be successfully received) can be determined.

The signal bandwidth is inversely proportional to the loaded quality factor of the parallel resonant circuit of the transmit section 42 (see equation (3) above). The processing unit 50 generates and transmits a control signal to the variable resistance 62 of the transmit section 42 to adjust the resistance value of the variable resistance 62 to a value at which the loaded quality factor of the parallel resonant circuit of the transmit section 42 supports the required signal bandwidth and data rate for transmission of signals under the selected modulation scheme.

It will be appreciated that the processing unit 50 is able to determine the SNR of a signal received by the receive antenna section 44 of the transceiver 40 every time such a signal is received, and thus the modulation scheme and quality factor used to transmit data signals can be dynamically adjusted according to prevailing channel conditions (e.g. distance between the transmitting antenna 46 and the receiving antenna 72) to ensure that the best possible data rate is achieved automatically, regardless of changes to the channel conditions, such as a change in antenna separation.

Figure 4:
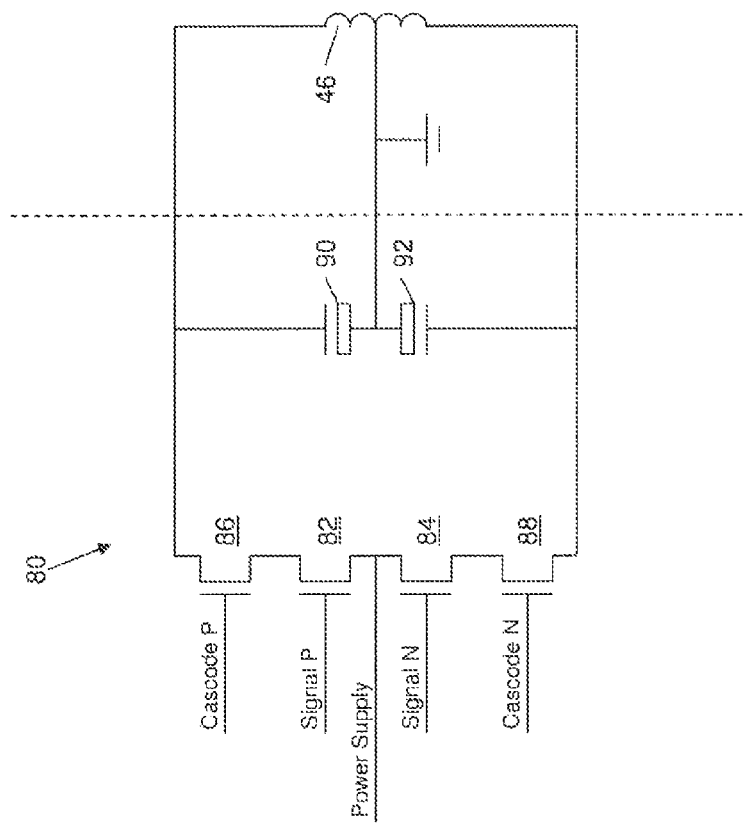
FIG. 4 is a schematic representation of an exemplary circuit implementation of the transmit section shown in FIG. 3.

Turning now to FIG. 4, an exemplary circuit for implementing the transmit antenna section 42 of FIG. 3 is shown generally at 80. In the implementation illustrated in FIG. 4

PMOS transistors 82, 84 constitute a power amplifier providing differential current outputs, which are connected to input terminals of the antenna 46 via variable transconductance (gm) cascodes 86, 88 connected to the differential outputs of the power amplifier. As will be appreciated by those skilled in the art, it would be possible to rearrange the circuit illustrated in FIG. 4 so that a positive power supply was connected to the centre tap of the antenna 46, in which case NMOS transistors would be used, and the transistors 82, 84 would be connected to ground rather than to a positive power supply rail.

A digitally variable capacitor (CDAC) formed from switchable MOS capacitors represented as 90 and 92 is connected in parallel with the antenna 46 such that the antenna 46, variable transconductance cascodes 86, 88 and capacitors 90, 92 form a parallel resonant circuit.

The variable transconductance cascodes 86, 88 permit the output impedance of the amplifier formed by transistors 82, 84 to be adjusted, thereby permitting the loaded quality factor of the circuit 80 to be controlled. The CDAC formed by the capacitors 90, 92 permits the resonant frequency of the parallel resonant circuit formed by the antenna 46, variable transconductance cascodes 86, 88 and capacitors 90, 92 to be adjusted.

The transistors 82, 84, cascodes 86, 88 and capacitors 90, 92 of the circuit 80 may be implemented as part of an integrated circuit (i.e. may be "on-chip" components), whilst the antenna 46 is an off-chip component (i.e. it is external to the integrated circuit containing the power amplifier 14). The circuit 80 therefore minimises the number of off-chip components, which helps to reduce the bill of materials (BOM) cost of aNULEF transceiver 40 incorporating a transmit antenna section 42 and a receive antenna section 44 of the type illustrated in FIG. 3.

In the transmit antenna section 42 and the receive antenna section 44 described above and illustrated in FIGS. 2, 3 and 4 a variable capacitance 64 is provided to permit adjustment of the resonant frequency of the parallel resonant circuits of the transmit antenna section 42 and the receive antenna section 44. However, it will be appreciated that the variable capacitance 64 could be replaced by an appropriate fixed capacitance, although in this case the resonant frequency of the parallel resonant circuit cannot be adjusted, and so if the resonant frequency of the parallel resonant circuit is not equal to the centre frequency of the carrier frequency of the signal to be transmitted optimum transmission of the modulated carrier signal will not be possible.

In order to keep the received SNR high, the LNA 78 must have a good noise figure. The presence of any resistive loss in the receive antenna section 44 that includes any variable resistor for Q factor adjustment will generate unwanted thermal noise. Therefore it is desirable to avoid using physical variable resistors in the receive antenna section 44. Instead, inductive or capacitive degeneration techniques can be employed in the LNA 78 to present the required resistance (the effective parallel resistance 76) to the antenna matching network in receive mode. The inductive or capacitive degeneration techniques used permit the effective parallel resistance 76 to be varied such that the loaded quality factor can be adjusted as described above, whilst obviating the thermal noise associated with a physical variable resistor.

The invention claimed is:

1. A transceiver for use in a communications system that uses magnetic field induction to transmit data, the transceiver comprising:
    an antenna;
    a transmit section including:
        an amplifier for driving an antenna;
        a capacitance connected in parallel with the antenna;
        a resistance connected in parallel with the capacitance and the antenna, such that the antenna, capacitance and resistance form a parallel resonant circuit, wherein the value of the resistance is variable to permit adjustment of the loaded quality factor of the resonant circuit; and
        a processing unit configured to determine a signal to noise ratio (SNR) of a signal received by the transceiver and to select, based on the determined SNR of the signal received by the transceiver, a modulation scheme for modulating a signal to be transmitted subsequently by the transceiver; and
    a receive section, separate from the transmit section, the receive section including:
        a resonant circuit comprising a variable resistance, a capacitance and a self-impedance of the antenna, the variable resistance of the receive section being implemented by inductive or capacitive degeneration.

2. A transceiver according to claim 1 wherein the value of the capacitance is variable, to permit tuning of a resonant frequency of the resonant circuit.

3. A transceiver according to claim 1 wherein the processing unit is configured to control the value of the resistance.

4. A transceiver according to claim 1 wherein the processing unit is configured to adjust the value of the resistance to adjust the loaded quality factor of the parallel resonant circuit to support the signal bandwidth required by the selected modulation scheme.

5. A transceiver according to claim 1 wherein the value of the capacitance is variable to permit tuning of a resonant frequency of the parallel resonant circuit, the processing unit being configured to control the value of the capacitance.

6. A transceiver according to claim 1 wherein the power amplifier is implemented by one or more transistors.

7. A transceiver according to claim 6 wherein the transistors are PMOS or NMOS transistors.

8. A transceiver according to claim 1 wherein the resistance is implemented by one or more variable cascodes.

9. A transceiver according to claim 1 wherein the capacitance is implemented by one or more digitally variable capacitors.

* * * * *